(12) United States Patent
Choi et al.

(10) Patent No.: US 8,823,860 B2
(45) Date of Patent: Sep. 2, 2014

(54) APPARATUS FOR AUTO-FOCUSING DETECTION, CAMERA APPLYING THE SAME, AND METHOD FOR CALCULATING DISTANCE TO SUBJECT

(75) Inventors: Woo-Seok Choi, Suwon-Si (KR); Jeong-Won Lee, Seongnam-Si (KR)

(73) Assignee: Samsung Electronics Co., Ltd (KR)

( * ) Notice: Subject to any disclaimer, the term of this patent is extended or adjusted under 35 U.S.C. 154(b) by 218 days.

(21) Appl. No.: 13/035,201

(22) Filed: Feb. 25, 2011

(65) Prior Publication Data

US 2011/0234835 A1   Sep. 29, 2011

(30) Foreign Application Priority Data

Mar. 24, 2010   (KR) .................. 10-2010-0026327

(51) Int. Cl.
| | |
|---|---|
| H04N 5/232 | (2006.01) |
| G03B 13/00 | (2006.01) |
| H04N 5/225 | (2006.01) |
| G03B 9/04 | (2006.01) |
| G03B 9/22 | (2006.01) |
| H04N 5/357 | (2011.01) |
| G03B 9/14 | (2006.01) |
| G03B 13/36 | (2006.01) |
| G02B 7/34 | (2006.01) |

(52) U.S. Cl.
CPC ............. *H04N 5/23212* (2013.01); *G03B 9/04* (2013.01); *G03B 9/22* (2013.01); *H04N 5/357* (2013.01); *H04N 5/2254* (2013.01); *G03B 9/14* (2013.01); *G03B 13/36* (2013.01); *G02B 7/346* (2013.01)

USPC ............................................ 348/345; 348/360

(58) Field of Classification Search
USPC ........... 348/345, 349, 354–356, 49, 335, 360; 396/89
See application file for complete search history.

(56) References Cited

U.S. PATENT DOCUMENTS

| | | | | |
|---|---|---|---|---|
| 4,855,777 A | * | 8/1989 | Suda et al. ..................... | 396/121 |
| 6,473,126 B1 | * | 10/2002 | Higashihara et al. ......... | 348/345 |
| 6,933,978 B1 | * | 8/2005 | Suda ............................. | 348/345 |
| 7,358,999 B2 | * | 4/2008 | Ikeda ............................ | 348/349 |
| 7,916,309 B2 | | 3/2011 | Gharib et al. | |
| 7,961,246 B2 | * | 6/2011 | Watanabe ..................... | 348/363 |
| 8,259,306 B2 | | 9/2012 | Gharib et al. | |
| 2003/0086014 A1 | * | 5/2003 | Murata et al. ................ | 348/363 |
| 2008/0137215 A1 | * | 6/2008 | Nurishi ......................... | 359/698 |
| 2008/0259354 A1 | | 10/2008 | Gharib et al. | |
| 2011/0193942 A1 | * | 8/2011 | Gharib et al. ................. | 348/46 |
| 2012/0162392 A1 | | 6/2012 | Gharib et al. | |

FOREIGN PATENT DOCUMENTS

| | | |
|---|---|---|
| JP | 2002-006205 | 1/2002 |
| KR | 1020100017236 | 2/2010 |

* cited by examiner

*Primary Examiner* — Nhan T Tran
(74) *Attorney, Agent, or Firm* — The Farrell Law Firm, P.C.

(57) ABSTRACT

An apparatus for auto-focusing detection, a camera applying the same, and a method for calculating a distance to a subject are disclosed. The camera calculates a focusing control state based on synthetic image data output as an image passing through a pupil split unit provided with a filter arranged at one or more of the at least two holes as taken by an image pickup unit.

16 Claims, 15 Drawing Sheets

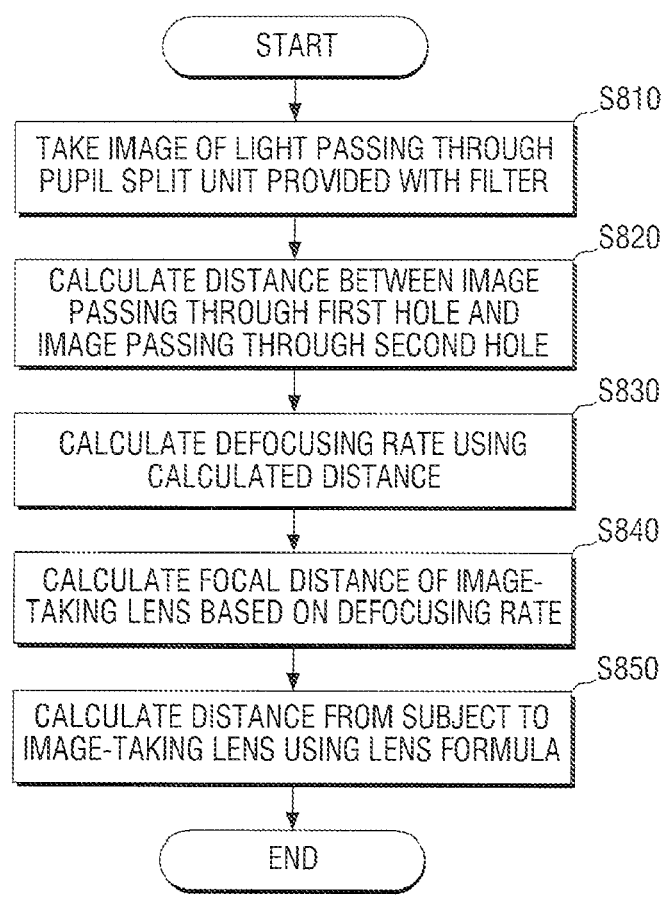

APPARATUS FOR AUTO-FOCUSING DETECTION, CAMERA APPLYING THE SAME, AND METHOD FOR CALCULATING DISTANCE TO SUBJECT

CROSS-REFERENCE TO RELATED APPLICATIONS

This application claims priority from Korean Patent Application No. 10-2010-0026327, filed on Mar. 24, 2010, in the Korean Intellectual Property Office, the disclosure of which is incorporated herein by reference in its entirety.

BACKGROUND OF THE INVENTION

1. Field of the Invention

The present invention relates to an apparatus for auto-focusing detection, a camera applying the same, and a method for calculating a distance to a subject, and more particularly, to an apparatus for auto-focusing detection, a camera applying the same, and a method for calculating a distance to a subject, in which a focus is automatically controlled using an image pickup sensor without using a separate sensor.

2. Description of the Related Art

With the spread of multimedia devices and Internet, users frequently store photographs taken by themselves in a multimedia device or upload them in Internet blog. Consequently, camera ownership has increased in recent years.

Recently, cameras include an auto focusing (AF) function, which enables automatic focus adjustment. In general, AF systems use a contrast method or a phase difference detection method.

In the contrast mode, since the amount of defocus cannot be measured directly, measurements should be performed several times.

In the phase difference detection mode, although focusing is performed in a short time, a dedicated detection unit is required, with a separate optical system that guides light for focusing detection.

In this environment, a pupil split type auto focusing detection apparatus has been developed. Since the pupil split type apparatus detects a focus using an image sensor, it does not require a separate sensor for auto focusing detection.

An example of the pupil split type apparatus splits light into a time series of samples.

SUMMARY OF THE INVENTION

The present invention is directed to an apparatus for auto-focusing detection, a camera applying the same, and a method for calculating a distance to a subject, which substantially obviate one or more problems due to limitations and disadvantages of the related art.

An object of the present invention is to provide an apparatus for auto-focusing detection, a camera applying the same, and a method for calculating a distance to a subject, in which a focusing control state is calculated based on synthetic image data output as an image passing through a pupil split unit provided with a filter arranged at one or more of at least two holes as taken by an image pickup unit.

To achieve these objects and other advantages and in accordance with the purpose of the invention, as embodied and broadly described herein, a camera comprises a pupil split unit, which includes at least two holes to split a beam of light passing through an image-taking lens into at least two beams of light; a filter arranged at one or more of the at least two holes, reducing a quantity of light passing through one or more of the holes; an image pickup unit taking an image with light passing through the pupil split unit; and a calculation unit calculating a focusing control state based on synthetic image data output as images passing through the at least two holes of the pupil split unit as taken by the image pickup unit.

In another aspect of the present invention, an apparatus for automatically controlling a focus of a camera comprises a pupil split unit, which includes at least two holes to split a beam of light passing through an image-taking lens into two beams of light; a filter arranged at one ore more of the at least two holes, reducing a quantity of light passing through one or more of the holes; and a calculation unit calculating a focusing control state based on synthetic image data output as images passing through the at least two holes of the pupil split unit.

In yet another aspect of the present invention, a method for calculating a distance to a subject comprises taking an image passing through a pupil split unit, which includes at least two holes splitting a beam of light passing through an image-taking lens into two beams of light and a filter reducing a quantity of light, the filter being arranged at one or more of the at least two holes; and calculating a distance from the subject to the image-taking lens based on synthetic image data output as images passing through the at least two holes of the pupil split unit.

BRIEF DESCRIPTION OF THE DRAWINGS

Various features, aspects and benefits of the embodiments of the invention will become apparent and more readily appreciated from the following description of the embodiments, taken in conjunction with the accompanying drawings, of which:

FIG. 8 is a flow chart illustrating a method of measuring a distance to a subject, according to an embodiment of the present invention.

DETAILED DESCRIPTION OF EXEMPLARY EMBODIMENTS

Figure 1:
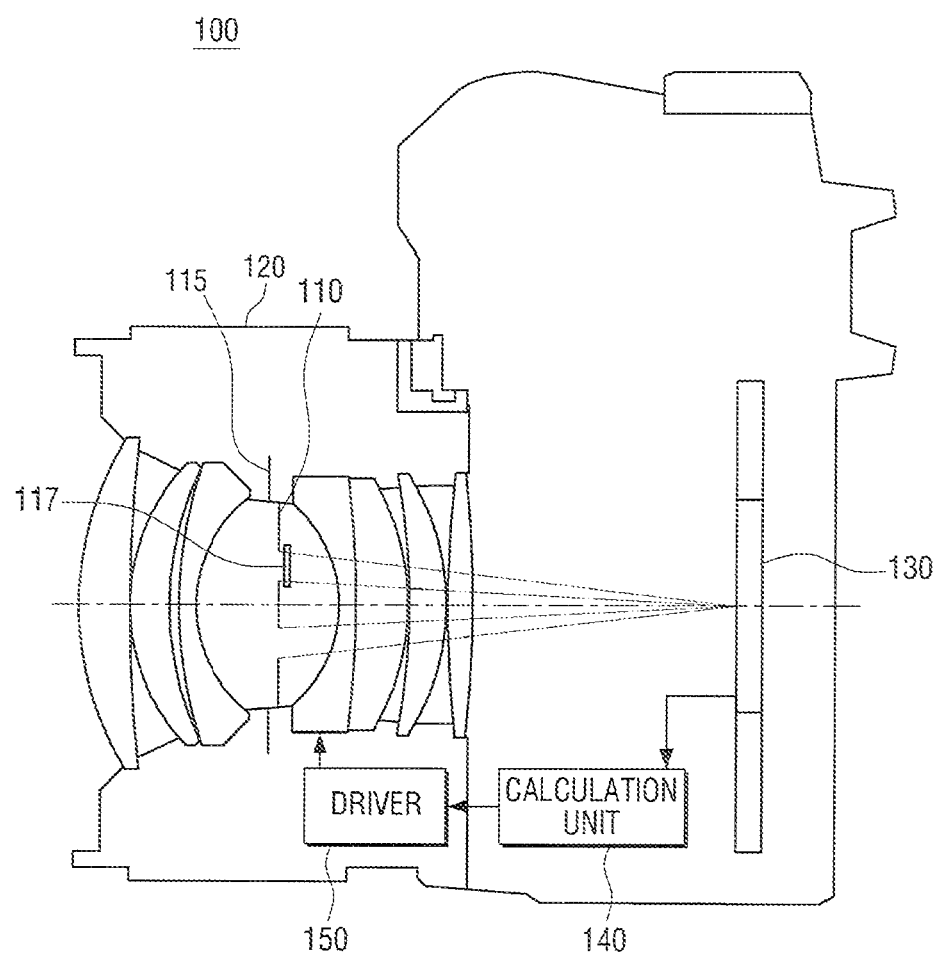
FIG. 1 illustrates a structure of a camera that includes an apparatus for auto-focusing detection according to an embodiment of the present invention.

Certain embodiments of the present invention will now be described in greater detail with reference to the accompanying drawings.

In the following description, same drawing reference numerals are used for the same elements even in different drawings. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

FIG. 1 illustrates a structure of a camera 100 that includes an apparatus for auto-focusing detection according to an embodiment of the present invention. As illustrated in FIG. 1, the camera 100 may include a pupil split unit 110, an iris 115, a filter 117, an image-taking lens 120, an image pickup unit 130, a calculation unit 140, and a driver 150.

The pupil split unit 110 may split the light passing through the image-taking lens 120 into two beams of light. To this end, the pupil split unit 110 may include two holes having the same size.

The filter 117 may be arranged at one of the two holes of the pupil split unit 110. The filter 117 may serve to reduce a quantity of light. Accordingly, the filter 117 may be a neutral density (ND) filter. Since the filter 117 is arranged at one of the two holes, the two beams of light passing through the pupil split unit 110 may each have their own respective quantity of light (i.e., brightness or luminance). In other words, the beam of light passing through the two holes may have different brightnesses. Accordingly, the camera 100 can identify two images by using the difference in brightness of the beams of light passing through the two holes. As described above, since the beams of light passing through the two holes have different brightnesses, the camera 100 can calculate a direction for controlling a focus and defocusing amount.

The pupil split unit 110 may split the light when the camera 100 automatically controls focus. In other cases, the pupil split unit 110 may be arranged so as not to cover the light passing through the image-taking lens 120.

The pupil split unit 110 may be driven by the same driving source as that of a quantity of light control unit of the camera. For example, if the pupil split unit 110 is arranged at the iris 115 as illustrated in FIG. 1, it is driven by the same driving source as that of the iris 115.

The driving source (not shown) may drive the pupil split unit 110 as that light passing through the image-taking lens 120 strikes the pupil split unit during automatic focusing. The driving source may drive the pupil split unit 110 so that light passing through the image-taking lens 120 does not strike the pupil split unit when automatic focusing is not enabled.

Also, the pupil split unit 110 may be arranged together with or in a single body with the quantity of light control unit of the camera. In more detail, the pupil split unit 110 may be arranged at the iris 115 of the camera 100 in a single body with the iris 115. The iris 115 provided with a pupil split unit 110 in a single body will be described later in more detail with reference to FIG. 5A and FIG. 5B.

In addition, the pupil split unit 110 may be arranged at a shutter (not shown) of the camera in a single body with the shutter. The shutter provided with a pupil split unit 110 in a single body will be described later in more detail with reference to FIG. 4A and FIG. 4B.

The pupil split unit 110 may be arranged together with a neutral density (ND) filter (not shown) of the camera. The pupil split unit provided with the ND filter will be described later in more detail with reference to FIG. 3A to FIG. 3C.

The iris 115 creates a beam of incident light, which can be varied in size, and serves to determine the quantity of incident light. Since the iris 115 may be arranged between lenses, images of iris 115 are formed by the lenses. In more detail, a virtual image of the iris 115 which is formed by a lens arranged at the front (between subject and iris) of the iris 115 will be referred to as entrance pupil, while a virtual image of the iris which is formed by a lens arranged at the rear (between iris and pickup area) of the iris 115 will be referred to as an exit pupil. In particular, since the exit pupil is an image of the iris 115 which is important for determining the brightness of a photograph, it becomes an important element for brightness control.

The image-taking lens 120 may collect light from a subject to form an image on the image pickup unit 130. The image-taking lens 120 may include a plurality of lenses, which form optical groups based on function. In more detail, the image-taking lens 120 may include a focus lens. The image-taking lens 120 has a focus position which varies with a position of the focus lens.

Accordingly, the image-taking lens 120 may include the driver 150. The driver 150 may receive auto focusing control information from the calculating unit 140 to drive the focus lens to fix a focus.

Also, the image-taking lens 120 may include the iris 115. The iris 115 may control a quantity of light passing through the image-taking lens 120 and the depth of an image. If the iris 115 becomes wider, since the image-taking lens 120 passes more light, a user can take brighter photographs. However, if the iris 115 becomes wider, since an aperture becomes great, the depth of the photograph becomes lower. On the other hand, if the iris 115 becomes narrow, since the image-taking lens 120 passes less light, a darker photograph is taken. Also, if the iris 115 becomes narrow, since the aperture becomes small, a photograph having deeper depth can be obtained.

The image pickup unit 130 corresponds to an area which photo-senses an image of a subject. With a film camera, a film is arranged on the image pickup unit 130. However, in case of a digital camera, image sensors are arranged on the image pickup unit 130. In this embodiment, the digital camera will be described.

Image sensors for photo-sensing an image of a subject are distributed in the image pickup unit 130. Examples of image sensors used in the digital camera include a charge coupled device (CCD) image sensor and a complementary metal oxide semi-conductor (CMOS) image sensor. The CCD image sensor and the CMOS image sensor operate based on the same basic principle.

Also, while the camera 100 is performing an auto focusing control function, the image pickup unit 130 may take an image formed by the two beams of light split through the pupil split unit 110. This is because that the pupil split unit 110 may be arranged to cover the beam of light passing through the image-taking lens 120 while the camera 100 is performing an auto focusing control function.

As described above, the image pickup unit 130 may take an image of a subject received through the image-taking lens 120 during image-taking, and may take an image received through the pupil split unit 110 during focusing control. To this end, the driving source (not shown) of the pupil split unit 110 may drive the pupil split unit 110 to allow the pupil split unit 110 to cover the beam of light passing through the image-taking lens 120 when focus is controlled. The driving source of the pupil split unit 110 may drive the pupil split unit 110 so that the pupil split unit 110 is arranged so as not to cover the beam of light passing through the image-taking lens 120 when auto focusing is not occurring.

As a result, the camera 100 can perform an auto focusing control function by using the image pickup unit 130 without a separate focusing control sensor.

The calculation unit 140 may calculate a focusing control state based on the synthetic image data output by taking the image formed by the two beams of light passing through the pupil split unit 110 to the image pickup unit 130. In this case, the synthetic image data mean images taken in a state that two images passing through the pupil split unit 110 are overlapped with each other. At this time, the calculation unit 140 may calculate the focusing control state of the camera 100 by phase difference detection based on the image passing through the pupil split unit 110.

In more detail, the beam of light passing through the two holes of the pupil split unit 110 form two overlap images on the image pickup unit 130. Accordingly, the synthetic image data detected from the image pickup unit 130 includes these double images. The calculation unit 140 may detect the focusing control state by calculating a deviation amount d of the double images.

For example, suppose that the amount by which the two images deviate from each other at a predetermined distance from pupil split unit 110 is d (see FIG. 2B) and a difference direction is an x-axis direction. In this case, supposing that the first image is f(x), the second image can be expressed by k×f(x−d). In this case, k may correspond to a transmittance of the filter. The two synthetic images may be expressed by f(x)+k×f(x−d). In other words, if the synthetic images and the deviation amount d are given, an image f(x) that is not synthesized can be extracted by calculation. In this case, if d is a right value, the extracted image f(x) may also become a right image. However, if d is a wrong value, the extracted image f(x) may also become a wrong image. The calculation unit 140 may find a condition that f(x) is most similar to an actual value, and estimate d corresponding to the condition as a deviation amount. This process is referred to as a ghost cancellation scheme and its details will be described later with reference to FIG. 6 to FIG. 7B.

Through the aforementioned process, the calculation unit 140 may calculate the deviation amount d and calculate a defocusing amount a (see FIG. 2B) by using the deviation amount d. In this case, the defocusing amount means a value representing an amount by which a focus lens 115 deviates from an on-focus point (i.e., focusing point). In more detail, referring to FIG. 2B, since the deviation amount d may be proportional to the defocusing amount a, the defocusing amount a can be calculated based on the deviation amount d. Accordingly, the calculation unit 140 can calculate the focusing control state by calculating the defocusing amount.

Also, the calculation unit 140 may calculate a focusing control direction depending on the brightness and position of two images taken on the image pickup unit 130 after passing through the two holes of the pupil split unit 110. In more detail, if a dark image is located on a region of image pickup unit 130 corresponding to the hole where the filter 170 is arranged and a bright image is located on a region of image pickup unit 130 corresponding to the hole where the filter 170 is not arranged, since the focus is located behind the image pickup unit 130, the calculation unit 140 may set a movement direction of the focus lens so that the focus becomes closer to the lens. On the other hand, if a bright image is located on a region of image pickup unit 130 corresponding to the hole where the filter 170 is arranged and a dark image is located on a region of image pickup unit 130 corresponding to the hole where the filter 170 is not arranged, since the focus is located in front of the image pickup unit 130, the calculation unit 140 may set a movement direction of the focus lens so that the focus becomes farther away from the lens. This will later be described in more detail with reference to FIG. 2B.

The calculation unit 140 may output a focusing control signal to a lens driver (not shown) of the image-taking lens 120 by using the calculation result of the focusing control state, thereby obtaining a correct focus. In more detail, the focusing control signal includes a movement direction control signal and a movement speed control signal of the focus lens. The calculation unit 140 may generate the movement direction control signal of the focus lens depending on the positions of the images generated by passing through the two holes. The calculation unit 140 may generate the movement speed control signal of the focus lens depending on the calculated defocusing amount. Namely, the calculation unit 140 may generate the movement speed control signal so that the movement speed of the lens becomes faster as the defocusing amount becomes greater.

Then, the driver 150 may drive the image-taking lens 120 to move the focus lens to the focusing position (i.e., on-focus point). In this case, the camera 100 may perform the auto focusing control function.

The structure of the camera 100 that includes an apparatus for auto-focusing detection has been described in detail above. Since the camera 100 constructed as above can perform the auto focusing control function without a separate unit, the camera maker can provide a camera that includes an auto focusing control function at a low cost.

Hereinafter, an apparatus for auto-focusing detection 200 will be described with reference to FIG. 2A and FIG. 2B.

Figure 2A:
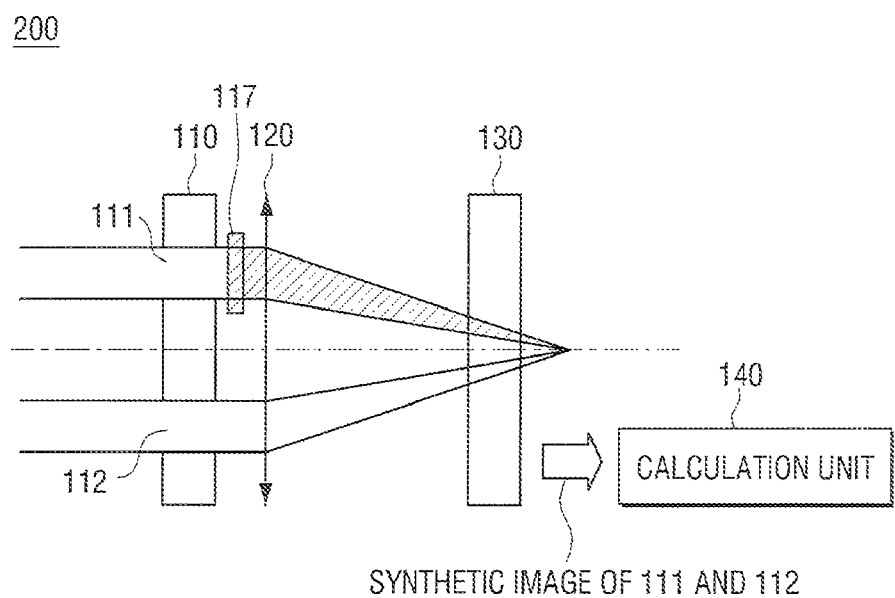
FIG. 2A illustrates an apparatus for auto-focusing detection according to an embodiment of the present invention.

FIG. 2A illustrates an apparatus for auto-focusing detection 200 according to an embodiment of the present invention.

As illustrated in FIG. 2A, the apparatus for auto-focusing detection 200 may include a pupil split unit 110, a filter 117, an image-taking lens 120, an image pickup unit 130 and a calculation unit 140. In this case, the pupil split unit 110 may include a first hole 111 and a second hole 112. The filter 117 may be arranged at the first hole 111. Accordingly, the filter 117 may reduce the quantity of light passing through the first hole 111. As a result, luminance (or brightness) of the light passing through the first hole 111 may become lower than that of the light passing through the second hole 112.

It is noted that the incident light may be split by the first hole 111 and the second hole 112 of the pupil split unit 110. The synthetic image of the incident light from the first hole 111 and the second hole 112 may be received by the image pickup unit 130, and the image pickup unit 130 may output the image data of the synthetic image to the calculation unit 140. Since other functions are the same as those of FIG. 1, their detailed description will be omitted.

Figure 2B:
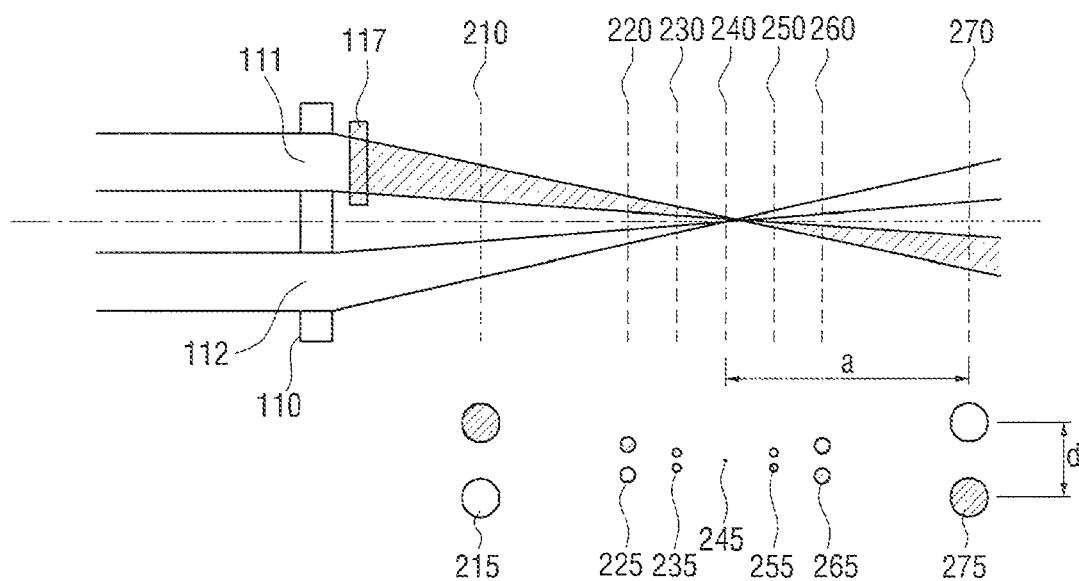
FIG. 2B illustrates shapes of images taken depending on a defocusing amount according to an embodiment of the present invention.

FIG. 2B illustrates shapes of images taken depending on a focus position, according to an embodiment of the present invention. Although the image pickup unit 130 is shown in FIG. 2B to be in a series of positions, this is only for convenience of description. The position of the image pickup unit 130 is actually fixed, and a shape of an image is changed based on the focus position. However, for convenience of description, FIG. 2B illustrates that the image pickup unit 130 is located at a series of position between the first position 210 to the seventh position 270. This is because the effect generated by movement of the focus is the same as that generated by movement of the image pickup unit 130.

The pupil split unit 110 of FIG. 2B may include the first hole 111 and the second hole 112, and it is noted that the filter 117 is arranged at the first hole 111. Accordingly, the light passing through the first hole 111 may be darker than the light passing through the second hole 112.

As illustrated in FIG. 2B, if the image pickup unit 130 is located at the first position 210, the image taken by the image pickup unit 130 may have the same shape as the first image 215. And if the image pickup unit 130 is located at the second position 220, the image taken by the image pickup unit 130 may have the same shape as the second image 225. Also, if the image pickup unit 130 is located at the third position 230, the image taken by the image pickup unit 130 may have the same shape as the third image 235.

The first position 210, the second position 220 and the third position 230 of the image pickup unit 130 are located in front of a focal surface (i.e., on-focus position) 240. It is also noted that the brighter image (i.e., image of the light passing through the second hole 112) of the first image 215, the second image 225, and the third image 235 is located at a lower position. If the image of light passing through the first hole 111, which is taken by the image pickup unit 130, and the image of light passing through the second hole 112 are located in the same relation as that of the first hole 111 and the second hole 112 of the pupil split unit 110, the image pickup unit 130 may be located at the front of the focal surface 240 (i.e., focus is located behind the image pickup unit 130).

As described above, if the image pickup unit 130 exists in a region (region where the first position 210, the second position 220, and the third position 230 are located) between the pupil split unit 110 and the focal surface 240, the focus is located behind the image pickup unit 130. In this case, to adjust the focus, the camera 100 should control the position of the focus lens so that the focus becomes closer to the image-taking lens. If the image pickup unit 130 is located at the focus surface 240 which is the fourth position, since this state is the right focus state (on-focus state), it is noted that the image pickup unit is expressed by a dot such as the fourth image 245.

Also, as illustrated in FIG. 2B, if the image pickup unit 130 is located at the fifth position 250, the image taken by the image pickup unit 130 may have the same shape as the fifth image 255. And, if the image pickup unit 130 is located at the sixth position 260, the image taken by the image pickup unit 130 may have the same shape as the second image 265. Also, if the image pickup unit 130 is located at the seventh position 270, the image taken by the image pickup unit 130 may have the same shape as the seventh image 275.

The fifth position 250, the sixth position 260 and the seventh position 270 of the image pickup unit 130 are located behind the focal surface 240. It is also noted that the brighter image (i.e., image of light passing through the second hole 112) of the fifth image 255, the sixth image 265, and the seventh image 275 is located at an upper position. If the image of light passing through the first hole 111, which is taken by the image pickup unit 130, and the image of light passing through the second hole 112 are located at the opposite position to that of the first hole 111 and the second hole 112 of the pupil split unit 110, the image pickup unit 130 may be located behind the focal surface 240 (i.e., focus may be located in front of the image pickup unit 130).

As described above, if the image pickup unit 130 exists behind the focal surface 240 (region where the fifth position 250, the sixth position 260, and the seventh position 270 are located), the focus may be located between the pupil split unit 110 and the image pickup unit 130. In this case, to adjust the focus, the camera 100 should control the position of the focus lens so that the focus becomes farther away from the image-taking lens.

Also, since the filter 117 may be arranged at the first hole 111, the image of the flux of light passing through the second hole 112 is brighter. Accordingly, it is determined where the brighter image of the two images taken by the image pickup unit 130 is detected, to determine whether the focal surface 240 is located in front of or behind of the image pickup unit 130.

Accordingly, the calculation unit 140 may determine where the brighter image of the two images taken by the image pickup unit 130 is detected, and calculate the focusing control direction based on the detected position.

As described above, the calculation unit 140 may determine the current focus state and calculate the focusing control direction by using the difference in brightness between then light passing through the first hole 111 of the pupil split unit 110 and the light passing through the second hole 112 of the pupil split unit 110.

Also, the calculation unit 140 may calculate the deviation amount d indicating position deviation between the two images by using the ghost cancellation scheme. The calculating unit 140 may calculate the defocusing amount a indicating how far the current focal surface 240 is away from the image pickup unit 130, by using the deviation amount d of the two images. Since the focal surface 240 is farther away from the image pickup unit 130 if the deviation amount d is great, the defocusing amount a becomes great if the deviation amount d becomes great. Accordingly, the calculation unit 140 may calculate the defocusing amount a which is the distance between the image pickup unit 130 and the focal surface 240, based on the deviation amount d, by applying a proper proportional function to the deviation amount d.

As described above, the calculation unit 140 may calculate the focusing control direction and a defocus level based on the deviation amount of the two images taken by the image pickup unit 130 and the position of the two images. In this case, the defocus level represents the distance between the image pickup unit 130 and the focal surface 240.

As described above, the camera 100 may perform the auto-focusing detection function by using the pupil split unit 110 mounted in the quantity of light control unit, the image pickup unit 130 and the calculation unit 140, even without a separate apparatus for auto-focusing detection.

Hereinafter, an example of the pupil split unit 110 mounted in the quantity of light control unit will be described with reference to FIG. 3A to FIG. 5B.

Figure 3A:
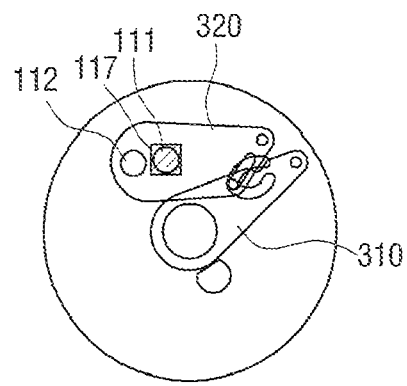
FIG. 3A to FIG. 3C illustrate a pupil split unit provided in an ND filter, according to an embodiment of the present invention.
Figure 3B:
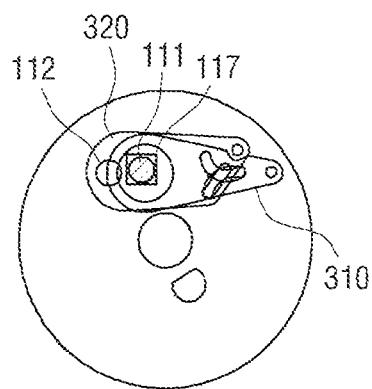
Figure 3C:
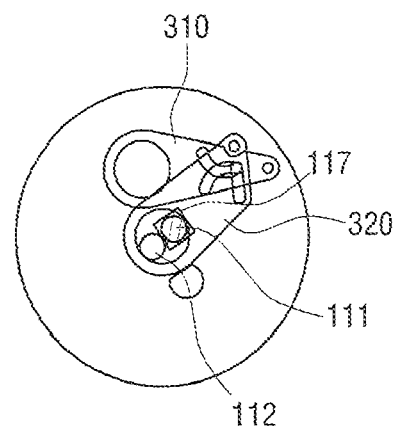

FIG. 3A to FIG. 3C illustrate a pupil split unit 320 provided in an ND filter 310, according to an embodiment of the present invention.

The ND filter 310 is a lens filter used when the brightness of a scene is controlled to be a low level. The ND filter 310 reduces the quantity of incident light of the lens equally over a range of wavelengths. If it is impossible to control brightness by using only the iris because the subject is too bright, or if the closing of the iris causes the depth of field to become deep, the ND filter 310 may be used to take an image without changing the depth or at least reducing the change of depth.

In FIG. 3A to FIG. 3C, the pupil split unit 320 may include the first hole 111 and the second hole 112. The filter 117 may be arranged at the first hole 111. Also, the pupil split unit 320 may be arranged together with the ND filter 310. The pupil split unit 320 and the ND filter 310 may be driven by one driving source. In other words, the driving source may drive the pupil split unit 320 and the ND filter 310 so that the pupil split unit 320 and the ND filter 310 are arranged at any state illustrated in FIG. 3A to FIG. 3C.

FIG. 3A illustrates that the ND filter 310 may be used while the camera takes a picture. As illustrated in FIG. 3A, the ND filter 310 may be arranged in the light path while the ND filter 310 is being used, and the pupil split unit 320 may be arranged upwardly out of the light path.

FIG. 3B illustrates that the ND filter 310 and pupil split unit 320 are not used. As illustrated in FIG. 3B, in a state that the ND filter 310 and the pupil split unit 320 are not used, the ND filter 310 and the pupil split unit 320 may be arranged out of the light path.

FIG. 3C illustrates that the pupil split unit 320 is used while the camera 100 is automatically controlling the focus. As illustrated in FIG. 3C, while the auto focusing detection function is being performed, the pupil split unit 320 may be arranged so that the first hole 111 and the second hole 112 are arranged in the light path.

As described above, the pupil split unit 320 may be arranged and driven together with the ND filter 310.

Figure 4A:
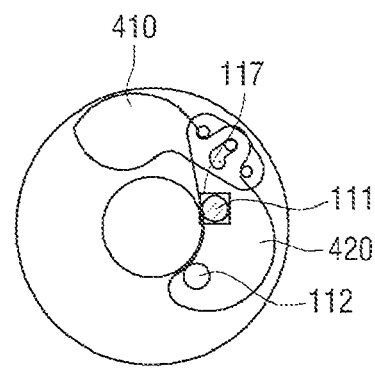
FIG. 4A to FIG. 4C illustrate a shutter provided with a pupil split unit in a single body, according to an embodiment of the present invention.
Figure 4B:
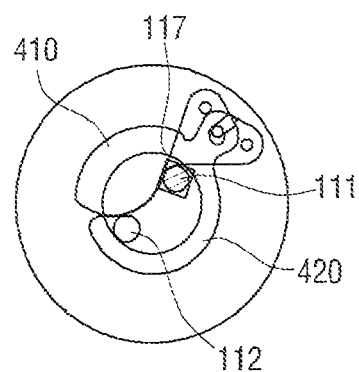
Figure 4C:
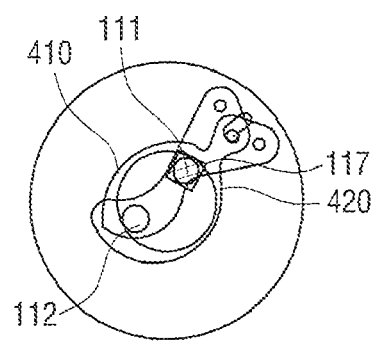

FIG. 4A to FIG. 4C illustrate a shutter provided with a pupil split unit in a single body, according to an embodiment of the present invention. In FIG. 4A to FIG. 4C, the first hole 111 and the second hole 112 of the pupil split unit may be arranged in a lens shutter as a single body. The filter 117 may be arranged at the first hole 111. As illustrated in FIG. 4A to FIG. 4C, the lens shutter may include a first shutter wing 410 and a second shutter wing 420. The first hole 111 and the second hole 112 may be arranged in the second shutter wing 420.

In FIG. 4A to FIG. 4C, as the lens shutter is driven by the driving source, the pupil split unit may be driven with the shutter. Accordingly, the driving source drives the first shutter wing 410 and the second shutter wing 420 so that the lens shutter is arranged at any of the states, illustrated in FIG. 4A to FIG. 4C depending on the status.

FIG. 4A illustrates a shutter open state for image-taking. As illustrated in FIG. 4A, in order to maintain the shutter open state, the first wing 410 and the second wing 420 are arranged to be out of the light path.

FIG. 4B illustrates a shutter pupil state for the auto focusing detection function. As illustrated in FIG. 4B, the first wing 410 and the second wing 420 may be engaged with each other so that the shutter is closed. However, since the second shutter wing 420 is arranged so that the first hole 111 and the second hole 112 are located on the light path, the incident light may pass through the first hole 111 and the second hole 112. As the first shutter wing 410 and the second shutter wing 420 are arranged as above, the shutter may perform the function of the pupil split unit 110.

FIG. 4C illustrates a shutter closed state in which the shutter is completely closed. As illustrated in FIG. 4C, the first wing 410 and the second wing 420 may be fully engaged with each other so that the first hole 111 and the second hole 112 are blocked. In this state, since the light path is completely cut off, the camera 100 is in the shutter close state.

As described above, the lens shutter can assume the shutter open state, the pupil split state, and the shutter closed state. Accordingly, the pupil split unit 110 may be arranged in a single body with the lens shutter.

Figure 5A:
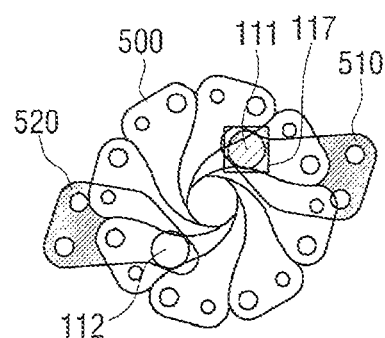
FIG. 5A and FIG. 5B illustrate an iris provided with a pupil split unit in a single body, according to an embodiment of the present invention.
Figure 5B:
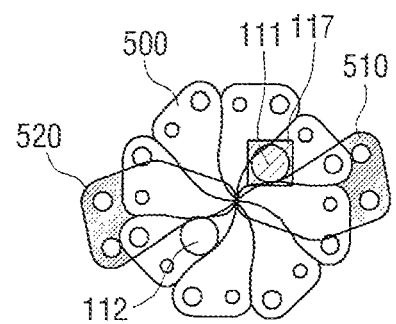

FIG. 5A and FIG. 5B illustrate an iris 500 provided with a pupil split unit 110 in a single body, according to an embodiment of the present invention. In FIG. 5A, the first hole 111 and the second hole 112 of the pupil split unit may be arranged at the iris 500 in a single body. The filter 117 may be arranged at the first hole 111. As illustrated in FIG. 5A, the iris 500 may include a first screen 510 and a second screen 520, and the first hole 111 and the second hole 112 may be covered by the first screen 510 and the second screen 520, respectively.

In FIG. 5A, the first screen 510 and the second screen 520 may be driven together by the driving source of the iris 500. Accordingly, the driving source may drive the iris 500, the first screen 510 and the second screen 520 so that the iris 500, the first screen 510 and the second screen 520 may be arranged at any of the states illustrated in FIG. 5A and FIG. 5B depending on the status.

FIG. 5A illustrates the iris 500 in a state to be used for image-taking. As illustrated in FIG. 5A, the first screen 510 and the second screen 520 may be arranged to cover the first hole 111 and the second hole 112, respectively.

FIG. 5B illustrates the iris 500 positioned to perform an auto focusing detection function. As illustrated in FIG. 5B, the first screen 510 and the second screen 520 may be arranged so as not to cover the first hole 111 and the second hole 112, respectively. Also the iris 500 may be closed. In this state, the incident light may pass through the first hole 111 and the second hole 112. As the iris 500, the first screen 510, and the second screen 520 are arranged as above, the iris 500 may perform the function of the pupil split unit 110.

As described above, the iris 500 can assume the iris use state and the pupil split state. Accordingly, the pupil split unit 110 may be arranged in a single body with the iris.

As described with reference to FIG. 3A to FIG. 5B, the pupil split unit 110 may be arranged together with or in a single body with the ND filter, the shutter, and the iris. Accordingly, the camera 100 may perform the auto focusing control function even without a separate apparatus for auto-focusing detection.

As described above, the beams of light passing through the two holes of the pupil split unit 110 may respectively form two overlapping images on the image pickup unit 130. The camera 100 may detect the focusing control state by calculating the deviation amount d corresponding to the distance between the two images based on the synthetic image data detected from the image pickup unit 130. The camera 100 may calculate the deviation amount d by using the ghost cancellation scheme, which will be described in detail with reference to FIG. 6 to FIG. 7B.

Figure 6:
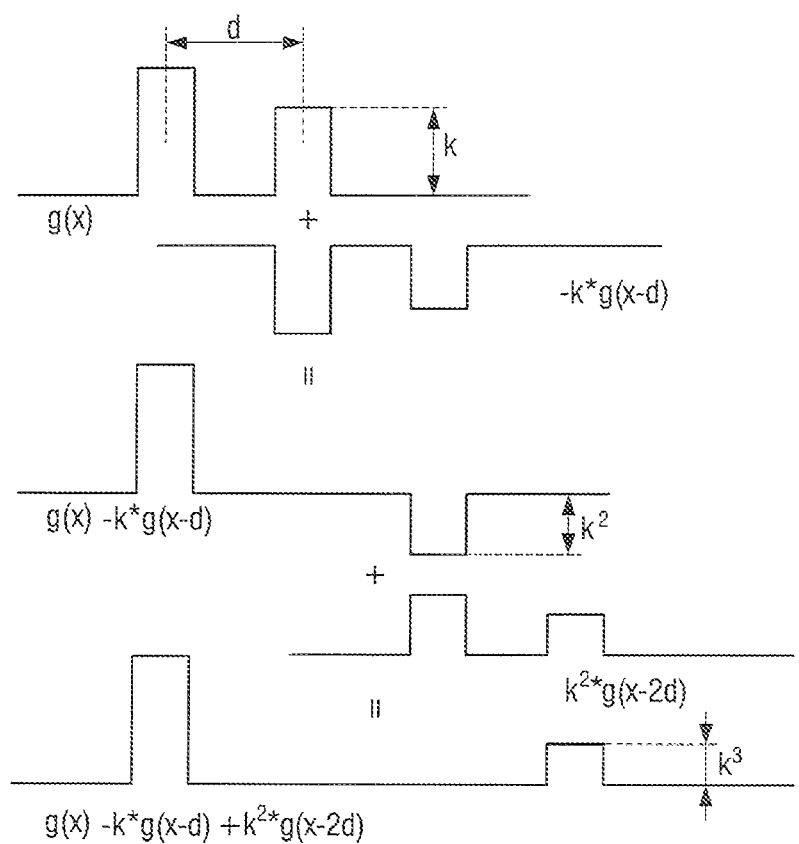
FIG. 6 illustrates a ghost cancellation scheme using a correct value of d, according to an embodiment of the present invention.

FIG. 6 illustrates that a ghost cancellation scheme is performed using a correct value of d, according to an embodiment of the present invention.

Suppose the filter 117 having a transmittance of k is mounted over the first hole 111, and suppose that image data passing through the second hole 112 having no filter is f(x). In this case, the image passing through the hole having a filter is k*f(x−d), wherein d is a deviation amount indicating the distance between two images. Since the deviation amount d is determined depending a defocusing amount a as described in FIG. 2B, the defocusing amount a may be identified by the deviation amount d.

In other words, supposing that overlap image taken by the image pickup unit 130 is g(x), the relation of g(x)=f(x)+k*f(x−d) is obtained. In this case, among various methods for obtaining the value of d of g(x), a ghost cancellation scheme may be used.

The ghost cancellation scheme is similar to the removal of a ghost signal from a TV signal, wherein the ghost signal occurs with a delay of a certain interval. As illustrated in FIG. 6, if a ghost signal having an amplitude reduced by a factor of k with a delay equivalent to d for g(x), a signal of k*g(x−d) is subtracted from g(x) of the original signal to remove the ghost signal. Then, in order to remove a secondary ghost signal, a calculation for adding $k^2$*g(x−2d) is performed. In this way, if the process of removing the ghost signal is repeated, the ghost signal is finally converged into 0, whereby the ghost signal is removed. As described above, the method of repeatedly performing calculation for removing ghost is referred to as the ghost cancellation scheme.

In more detail, the signal f(x) obtained by removing the ghost signal from the signal g(x) of which signal size factor to deviation amount of d is k can be obtained by $f(x)=g(x)+\Sigma(-k)^n*g(x-nd)$.

The camera according to this embodiment calculates the deviation amount of d which is the distance between two images of overlapping images passing through the pupil split unit 110. This calculation is the same as when a correct value of d is obtained through the ghost cancellation scheme. In other words, among the overlapping images g(x), the image (i.e., image having low brightness) passing through the first hole 111 is regarded as a ghost image of which signal size is k times, and the ghost cancellation scheme is performed for the image, whereby one original image which is not overlapped is recovered. At this time, the value of d corresponds to the correct deviation amount d.

In more detail, as illustrated in FIG. 6, if the ghost cancellation scheme is performed using the correct value of d, the ghost signals except for the original signal f(x) are removed.

Figure 7A:
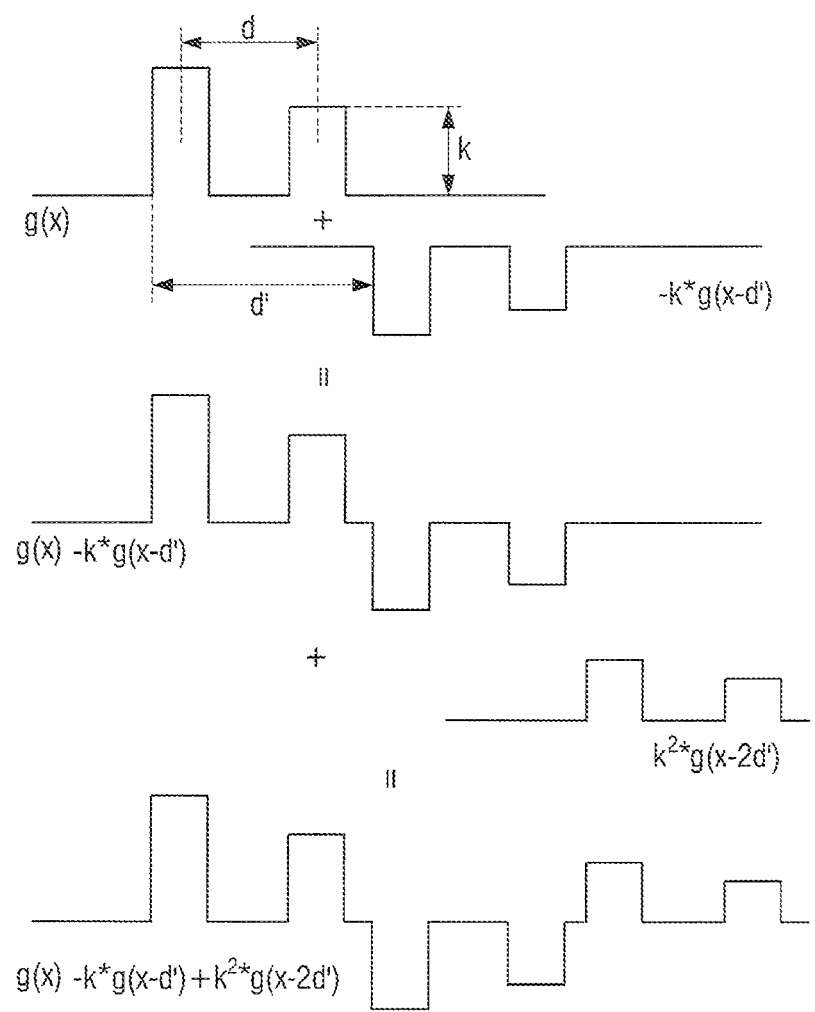
FIG. 7A and FIG. 7B illustrate a ghost cancellation scheme using an incorrect value old, according to an embodiment of the present invention.
Figure 7B:
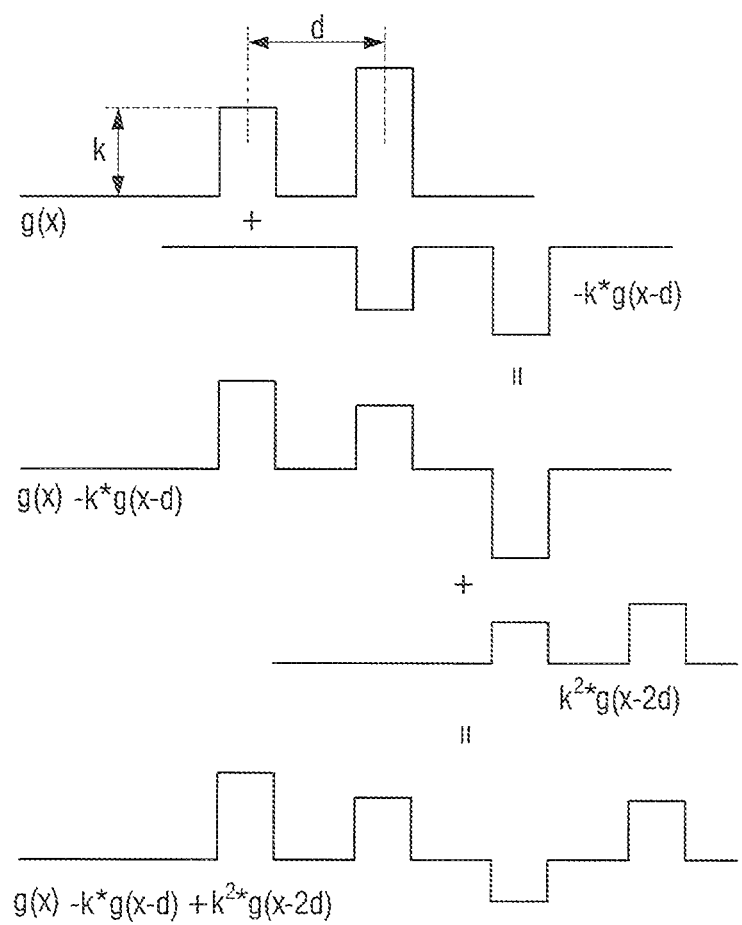

However, as illustrated in FIG. 7A and FIG. 7B, if the value of d is not correct, even though the ghost cancellation scheme is performed, the ghost signal may not be removed. FIG. 7A and FIG. 7B illustrate that the ghost cancellation scheme is performed using an incorrect value of d, according to an embodiment of the present invention.

As illustrated in FIG. 7A, if the size of the value of d is not correct, the original image is not recovered and an image having serious noise is obtained. Also, as illustrated in FIG. 7B, if the size of the value of d is correct but its direction is not correct, the original image is not recovered and an image having noise is obtained.

Accordingly, the calculation unit 140 of the camera 100 may obtain the correct deviation amount d by comparing ghost cancellation result images to which various values of d are applied, even without information of the original image and selecting the value of d for the clearest image.

At this time, the calculation unit 140 of the camera 100 may use a method of measuring contrast of an image to estimate whether the original image is identical with the ghost cancellation result image, thereby selecting the correct value of d.

As described above, the calculation unit 140 of the camera 100 may perform a ghost cancellation calculation while changing the value of d in an image pixel unit within a specific ranging. The calculation unit 140 may select one of the ghost cancellation result images, which is the closest to the original image, and finally determine the value of d used for the ghost cancellation scheme as the deviation amount of d.

As described above, the calculation unit 140 of the camera 100 may calculate the deviation amount of d by using the ghost cancellation scheme, and detects a focus by calculating the defocusing amount using the deviation amount of d.

Hereinafter, a process of calculating the distance to a subject in the camera 100 will be described with reference to FIG. 8. FIG. 8 is a flow chart illustrating a method of measuring a distance to a subject, according to an embodiment of the present invention.

The camera 100 takes an image formed by two beams of light split through the pupil split unit 110 by using the image pickup unit 130 (S810). This is because the pupil split unit 110 is arranged to cover the beam of light passing through the image-taking lens 120 while the camera 100 is performing the auto focusing control function. At this time, the filter 117 is arranged at one of the two holes.

Afterwards, the camera 100 calculates the deviation amount d, which is the distance between the image passing through the first hole 111 and the image passing through the second hole 112, by using the ghost cancellation scheme (S820). In more detail, the beams of light passing through the two holes of the pupil split unit 110 respectively form two overlapping images on the image pickup unit 130. Accordingly, the synthetic image data detected from the image pickup unit 130 form double images. The calculation unit 140 of the camera 100 may calculate the deviation amount of d of the double images by using the ghost cancellation scheme.

The camera 100 may calculate the defocusing amount of a by using the calculated deviation amount of d (S830). In more detail, referring to FIG. 2B, since the deviation amount of d is proportional to the defocusing amount of a, if the camera knows the deviation amount of d, it can calculate the defocusing amount of a based on the deviation amount of d. Accordingly, the camera 100 can calculate the defocusing amount by using the deviation amount.

Afterwards, the camera 100 may calculate the focal distance of the image-taking lens 120 based on the defocusing amount (S840). Since the defocusing amount indicates the distance between the image pickup unit 130 and the focal surface, the camera can calculate the focal distance of the image-taking lens 120 by using the distance of the image-taking lens 120 and the image pickup unit 130 and the defocusing amount.

Then, the camera 100 may calculate the distance from the subject to the image-taking lens 120 by using the calculated focal distance, the distance between the image-taking lens 120 and the image pickup unit 130, and the lens formula (S850). In more detail, the lens formula is $1/a+1/b=1/f$, wherein a represents the distance from the subject to the image-taking lens 120, b represents the distance between the image-taking lens 120 and the image pickup unit 130, and f represents the focal distance of the image-taking lens 120.

Accordingly, the camera 100 may calculate the distance to the subject through the aforementioned steps. Also, the camera 100 may extract distance information of the subject by using the calculated distance, and may generate three-dimensional image data, which may include the distance information, by including the distance of the subject in the taken image.

Although the pupil split unit 110 includes two holes in this embodiment, it may include two or more holes. In this case, the image pickup unit 130 takes a plurality of beams of light split through the pupil split unit 110 during focusing control. The calculation unit 140 calculates the focusing control state based on the synthetic image data output as the image pickup unit 130 takes a plurality of beams of light passing through the pupil split unit 110. Also, the calculation unit 140 calculates the focusing control direction based on the brightness of the plurality of beams of light passing through the plurality of holes where the brightness is a result of one or more filters.

The foregoing embodiments and advantages are merely exemplary and are not to be construed as limiting the present invention. The present teaching can be readily applied to other types of apparatuses. Also, the description of the embodiments is intended to be illustrative, it will be appreciated by those skilled in the art that many changes, alternatives, modifications, and variations may be made without departing from the principles and spirit of the teachings of the present disclosure, the scope of which is defined in the appended claims and their equivalents.

What is claimed is:

1. A camera comprising:
   a pupil split unit, which includes at least two holes to split a beam of light passing through an image-taking lens into at least two beams of light;
   a filter arranged at one of the at least two holes, reducing a quantity of light passing through said one of the holes;

an image pickup unit taking an image with light passing simultaneously through the at least two holes of the pupil split unit; and a calculation unit calculating a focusing control state based on synthetic image data output as images, which are different in a quantity of light, passing through the at least two holes of the pupil split unit as taken by the image pickup unit, wherein the calculation unit performs a calculation regarding a focusing control direction based on a difference in a quantity of light of each image which is formed as light is split by the at least two holes, and wherein the focusing control direction is used to set a direction in which a focus lens is moved.

2. The camera according to claim 1, wherein the pupil split unit is driven by the same driving source as that of a quantity of light control unit.

3. The camera according to claim 1, wherein the pupil split unit is arranged together with or in a single body with a quantity of light control unit of the camera.

4. The camera according to claim 2, wherein the quantity of light control unit includes a shutter, an iris, or an optical filter or any combination thereof.

5. The camera according to claim 4, wherein the pupil split unit is arranged in the shutter in a single body with the shutter, and the shutter has a shutter open state, a shutter closed state, and a pupil split state.

6. The camera according to claim 4, wherein the pupil split unit is arranged on the iris in a single body with the iris, and the iris is driven to be a closed state when the pupil split unit is opened.

7. The camera according to claim 4, wherein the optical filter is a neutral density (ND) filter, and the pupil split unit is arranged together with the ND filter.

8. The camera according to claim 1, wherein the at least two holes have the same size as each other.

9. The camera according to claim 1, wherein the at least two holes include a first hole and a second hole, and the calculation unit calculates a focusing control direction depending on a position of an image formed by passing through the first hole and a position of an image formed by passing through the second hole.

10. The camera according to claim 1, wherein the at least two holes include a first hole and a second hole, and the calculation unit calculates a defocusing amount by calculating a distance between an image formed by light passing through the first hole and an image formed by light passing through the second hole.

11. The camera according to claim 10, further comprising a driver controlling a driving speed of a focus lens depending on the calculated defocusing amount and moving the focus lens in accordance with the controlled driving speed.

12. The camera according to claim 10, wherein the calculation unit calculates a distance between an image formed by light passing through the first hole and an image formed by light passing through the second hole by using a ghost cancellation scheme.

13. The camera according to claim 1, wherein the filter is a neutral density (ND) filter reducing quantity of light passing through one of the two holes.

14. An apparatus for automatically controlling a focus of a camera, the apparatus comprising:

a pupil split unit, which includes at least two holes to split a beam of light passing through an image-taking lens into two beams of light;

a filter arranged at one of the at least two holes, reducing a quantity of light passing through said one of the holes; and a calculation unit calculating a focusing control state based on synthetic image data output as images, which are different in a quantity of light, passing through the at least two holes of the pupil split unit, performs a calculation regarding a focusing control direction based on a difference in a quantity of light of each image which is formed as light is split by the at least two holes, wherein the focusing control direction is used to set a direction in which a focus lens is moved.

15. A method for calculating a distance to a subject, the method comprising:

taking an image passing through a pupil split unit, which includes at least two holes splitting a beam of light passing simultaneously through an image-taking lens into at least two beams of light, a filter reducing a quantity of light, the filter being arranged at one of the at least two holes, and a calculation unit that determines a location of each phase from a difference in a quantity of light of each phase split through the at least two holes, and calculates a focusing control direction based on the determined location of each phase; and calculating a distance from the subject to the image-taking lens based on synthetic image data output as images based on a difference in a quantity of light of each image which is formed as the light is split by the at least two holes.

16. The method according to claim 15, wherein the at least two holes include a first hole and a second hole, and the calculating includes:

calculating a distance between an image formed by light passing through the first hole and an image formed by light passing through the second hole;

calculating a defocusing amount by using the calculated distance;

calculating a focal distance of the image-taking lens based on the defocusing amount; and calculating the distance from the subject to the image-taking lens by using the calculated focal distance, a distance between the image-taking lens and an image pickup unit, and a lens formula.

* * * * *